US009480076B2

(12) United States Patent
Jung

(10) Patent No.: US 9,480,076 B2
(45) Date of Patent: Oct. 25, 2016

(54) METHOD AND APPARATUS FOR TRANSMITTING/RECEIVING WLAN NETWORK SHARING DATA OF WI-FI P2P GROUP

(75) Inventor: Bu Seop Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/276,559

(22) Filed: Oct. 19, 2011

(65) Prior Publication Data

US 2012/0106475 A1 May 3, 2012

(30) Foreign Application Priority Data

Oct. 27, 2010 (KR) ........................ 10-2010-0105168

(51) Int. Cl.
| | |
|---|---|
| H04W 4/00 | (2009.01) |
| H04L 12/58 | (2006.01) |
| H04W 72/12 | (2009.01) |
| H04L 29/08 | (2006.01) |
| H04L 12/64 | (2006.01) |
| H04W 76/02 | (2009.01) |
| H04W 84/12 | (2009.01) |

(52) U.S. Cl.
CPC ........ *H04W 72/121* (2013.01); *H04L 12/6418* (2013.01); *H04L 67/322* (2013.01); *H04W 72/1242* (2013.01); *H04W 76/023* (2013.01); *H04W 84/12* (2013.01)

(58) Field of Classification Search
CPC ............................. H04W 28/26; H04W 84/18
USPC ............................ 370/329, 338, 395.42, 443
See application file for complete search history.

(56) References Cited

U.S. PATENT DOCUMENTS

| | | | | |
|---|---|---|---|---|
| 8,954,502 | B1* | 2/2015 | Kopikare et al. ............. | 709/204 |
| 2002/0198929 | A1* | 12/2002 | Jones et al. .................. | 709/201 |
| 2007/0183373 | A1 | 8/2007 | Gao et al. | |
| 2008/0005120 | A1* | 1/2008 | Li .................................. | 707/10 |
| 2008/0069063 | A1* | 3/2008 | Li et al. ........................ | 370/338 |
| 2009/0019173 | A1* | 1/2009 | Wu et al. ...................... | 709/230 |
| 2009/0067362 | A1* | 3/2009 | Doppler et al. .............. | 370/315 |

(Continued)

FOREIGN PATENT DOCUMENTS

WO 2008/021627 A2 2/2008

OTHER PUBLICATIONS

Kawamura et al., A Priority Control Method for Wireless Multi-hop Access Using IEEE 802.11 DCT Mechanism, NTT Access Network Service Systems Laboratories, Sep. 5, 2004, pp. 520-524, vol. 1.

*Primary Examiner* — Dang Ton
*Assistant Examiner* — Ryan Kavleski
(74) *Attorney, Agent, or Firm* — Jefferson IP Law, LLP

(57) ABSTRACT

A method and apparatus for transmitting Wireless Local Area Network (WLAN) network sharing data of a Wi-Fi Peer-to-Peer (P2P) group are provided. The method includes forming the Wi-Fi P2P group, establishing, at a mobile station that is a Wi-Fi P2P group owner, a connection to a WLAN access point, determining whether data, to be communicated with a mobile station that is a Wi-Fi P2P client, is WLAN network sharing data, assigning, when the data is the WLAN network sharing data, a high priority to the WLAN network sharing data, preoccupying a radio channel for data transmission through channel access contention with the high priority, and transmitting the WLAN network sharing data through the preoccupied radio channel.

18 Claims, 4 Drawing Sheets

(56) References Cited

U.S. PATENT DOCUMENTS

| | | | |
|---|---|---|---|
| 2010/0142447 A1* | 6/2010 | Schlicht et al. | 370/328 |
| 2011/0019556 A1* | 1/2011 | Hsin et al. | 370/252 |
| 2011/0282989 A1* | 11/2011 | Geirhofer et al. | 709/224 |
| 2012/0020266 A1* | 1/2012 | Sun et al. | 370/311 |
| 2012/0030303 A1* | 2/2012 | Souza et al. | 709/207 |
| 2012/0087253 A1* | 4/2012 | Patil et al. | 370/252 |

\* cited by examiner

METHOD AND APPARATUS FOR TRANSMITTING/RECEIVING WLAN NETWORK SHARING DATA OF WI-FI P2P GROUP

PRIORITY

This application claims the benefit under 35 U.S.C. §119(a) of a Korean patent application filed on Oct. 27, 2010 in the Korean Intellectual Property Office and assigned Serial No. 10-2010-0105168, the entire disclosure of which is hereby incorporated by reference.

BACKGROUND OF THE INVENTION

1. Field of the Invention

The present invention relates to a Wireless Local Area Network (WLAN) network sharing data transmission/reception method and apparatus in a Wi-Fi Peer-to-Peer (P2P) group. More particularly, the present invention relates to a WLAN network sharing data transmission/reception method and apparatus for facilitating establishment of a radio channel for data transmission by assigning relatively a high priority to the WLAN network sharing data of a Wi-Fi P2P group.

2. Description of the Related Art

With the rapid advancements in information and semiconductor technologies, there has been a phenomenal growth in the use and popularity of mobile devices. Recent mobile devices are not just basic devices for providing dedicated services but are multifunctional devices supporting converged functions and services. As one of the representative mobile devices, the mobile communication terminal incorporates diverse supplementary functions including a TeleVision (TV) function, (e.g., Digital Multimedia Broadcasting (DMB) and Digital Video Broadcasting (DVB)), an audio playback function (e.g. Moving Picture Experts Group (MPEG)-1 or MPEG-2 Audio Layer-3 (MP3)), a camera function, a data communication function, an Internet access function, and a Wi-Fi function, as well as the basic voice communication and messaging functions. Wi-Fi is the function supporting Internet access service via an Access Point (AP). Recently, Wi-Fi Peer-to-Peer (P2P) connection technology draws attention as a new approach to establish wireless connection between two terminals equipped with Wi-Fi interfaces. The Wi-Fi P2P technology is similar to other short range wireless communication technologies such as Bluetooth, ZigBee, and Infrared Data Association (IrDA). However, Wi-Fi P2P is drawing attention as the substitute of other short range wireless communication technologies due to the advantages in security, power consumption, data rate, communication range, etc.

The Wi-Fi P2P technology can establish a Wi-Fi P2P group in the form of 1:1 or 1:multiple connection. At this time, a mobile station operates as a group owner and the other mobile stations operate as clients. The group owner is capable of establishing the P2P connection with the clients and the Wireless Local Area Network (WLAN) connection with the AP simultaneously. That is, the group owner acts as the AP to the P2P clients and as a mobile station to the WLAN AP. In this case, the radio channel between the WLAN AP and the P2P group owner and the radio channel between the P2P group owner and P2P client for Wi-Fi P2P network communication are identical with each other.

Meanwhile, the Wi-Fi P2P Media Access Control (MAC) protocol uses a contention-based radio channel access for data transmission. That is, the mobile stations contend for the radio channel based on a Carrier Sense Multiple Access with Collision Avoidance (CSMA/CA) protocol.

Accordingly, when a P2P client attempts to transmit data via a WLAN AP in the Wi-Fi P2P communication of the related art, the P2P client has to contend for the radio channel to the P2P owner and the P2P owner has to contend for the radio channel to the WLAN AP. Similarly, the Wi-Fi P2P communication of the related art requires the P2P client to perform contention twice to receive via the WLAN AP. Having to perform contention twice for the radio channel degrades the data rate, resulting in a user's inconvenience. More particularly, in a case of receiving a service sensitive to the Quality of Service (QoS), such as a voice and real-time video transmission, the user's dissatisfaction is likely to be even worse. Such dissatisfaction is likely to reflect on the devices, resulting in a bad impression of the devices. There is therefore a need for a method for reducing contention delay for transmitting/receiving the WLAN network sharing data in the Wi-Fi P2P group.

SUMMARY OF THE INVENTION

Aspects of the present invention are to address at least the above-mentioned problems and/or disadvantages and to provide at least the advantages described below. Accordingly, an aspect of the present invention is to provide a Wireless Local Area Network (WLAN) network sharing data transmission method and apparatus of a Wi-Fi Peer-to-Peer (P2P) group that is capable of improving transmission speed of the WLAN network sharing data outgoing to and incoming from outside of the WLAN.

Another aspect of the present invention is to provide a WLAN network sharing data transmission method and apparatus of a Wi-Fi P2P group that is capable of increasing the transmission speed of the WLAN network sharing data outgoing to and incoming from outside of the WLAN by assigning a relatively high priority to the WLAN network sharing data.

Another aspect of the present invention is to provide a WLAN network sharing data transmission method and apparatus of a Wi-Fi P2P group that is capable of improving transmission speed of the WLAN network sharing data by minimizing the channel accession contention delay.

In accordance with an aspect of the present invention, a method for transmitting WLAN sharing data of a Wi-Fi P2P group is provided. The method includes forming the Wi-Fi P2P group, establishing, at a mobile station that is a Wi-Fi P2P group owner, a connection to a WLAN access point, determining whether data, to be communicated with a mobile station that is a Wi-Fi P2P client, is WLAN network sharing data, assigning, when the data is the WLAN network sharing data, a high priority to the WLAN network sharing data, preoccupying a radio channel for data transmission through channel access contention with the high priority, and transmitting the WLAN network sharing data through the preoccupied radio channel.

In accordance with another aspect of the present invention, an apparatus for transmitting WLAN sharing data of a Wi-Fi P2P group is provided. The apparatus includes a WLAN unit for establishing a connection with at least one mobile station functioning as a Wi-Fi P2P client to form the Wi-Fi P2P group and for accessing a WLAN access point, and a control unit for determining whether data, to be communicated with the at least one mobile station operating as a Wi-Fi P2P client, is WLAN network sharing data, for assigning, when the data is the WLAN network sharing data, a high priority to the WLAN network sharing data, and for preoccupying a radio channel for data transmission through channel access contention using the high priority, wherein the WLAN unit transmits the WLAN network sharing data through the preoccupied radio channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
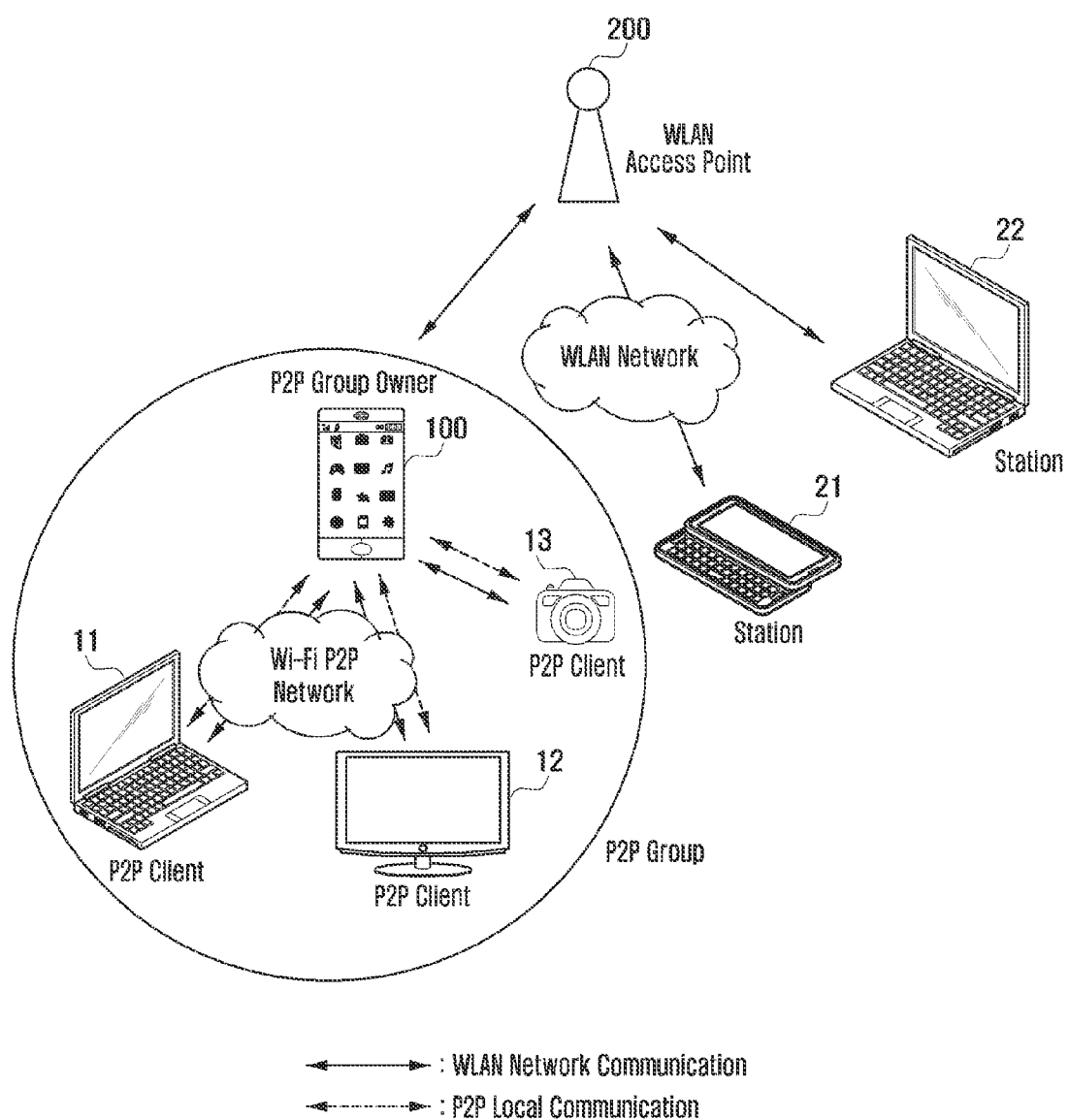
FIG. 1 is a schematic diagram illustrating an architecture of a Wireless Local Area Network (WLAN) network-sharing system with a Wi-Fi Peer-to-Peer (P2P) group according to an exemplary embodiment of the present invention.

FIG. 1 is a schematic diagram illustrating an architecture of a Wireless Local Area Network (WLAN) network-sharing system with a Wi-Fi Peer-to-Peer (P2P) group according to an exemplary embodiment of the present invention.

Referring to FIG. 1, the WLAN network-sharing system with Wi-Fi P2P group includes a WLAN Access Point (AP) 200, and mobile stations 100, 11, 12, and 13. Here, the mobile station 100 is a P2P group owner, and the mobile stations 11, 12, and 13 are P2P clients.

The WLAN AP 200 can establish a WLAN composed of the mobile stations 100, 21, and 22. At this time, the mobile stations 100, 21, and 22 contend for a radio channel to communicate data with the WLAN AP 200. The channel access contention is performed based on a Media Access Control (MAC) algorithm, e.g., Carrier Sense Multiple Access with Collision Avoidance (CSMA/CD). Since the channel access contention of WLAN is obvious to those skilled in the art of the present invention, a detailed description thereon is omitted herein.

The mobile station 100, as the P2P owner, can establish a Wi-Fi P2P group with at least one of the mobile terminals 11, 12, and 13 as P2P clients. The Wi-Fi P2P is a technique for providing direct communication among the mobile stations equipped with a Wi-Fi interface. The Wi-Fi P2P technique is also referred to as Wi-Fi Direct. The term 'Wi-Fi P2P' is used hereinafter. Here, the mobile station 100 can be the P2P group owner. That is, the mobile station 100 can act as a mobile station of the WLAN and the owner of the P2P group of the Wi-Fi P2P network, simultaneously. Since the mobile station 100 joins the WLAN and Wi-Fi P2P network concurrently using one WLAN communication unit (denoted by reference number 140 in FIG. 4), the radio channel for the WLAN and the radio channel for the Wi-Fi P2P network are identical with each other.

In the Wi-Fi P2P group, a MAC algorithm for contention-based data transmission is also adopted. Accordingly, when the P2P clients 11, 12, and 13 transmit and receive data to and from the WLAN AP 200, they have to contend for channel access twice. This means that it takes two times longer for the P2P clients 11, 12, and 13 to transmit/receive data via the WLAN as compared to the WLAN mobile stations 21, and 22. In order to address this problem, if there is a request for data transmission, the mobile station 100 determines if the request is for WLAN network sharing data and, if so, assigns a priority equal to that of voice and video data transmission defined in the Wi-Fi standard. Since exemplary embodiments of the present invention assign a relatively higher priority to the WLAN network sharing data, it is possible to increases the radio channel occupancy probability for data transmission. The priority assignment process is described in more detail with reference to FIG. 2. Meanwhile, in FIG. 1, the dotted line denotes the local data communication within the Wi-Fi P2P network, and the solid line denotes the data communication within the WLAN.

Figure 2:
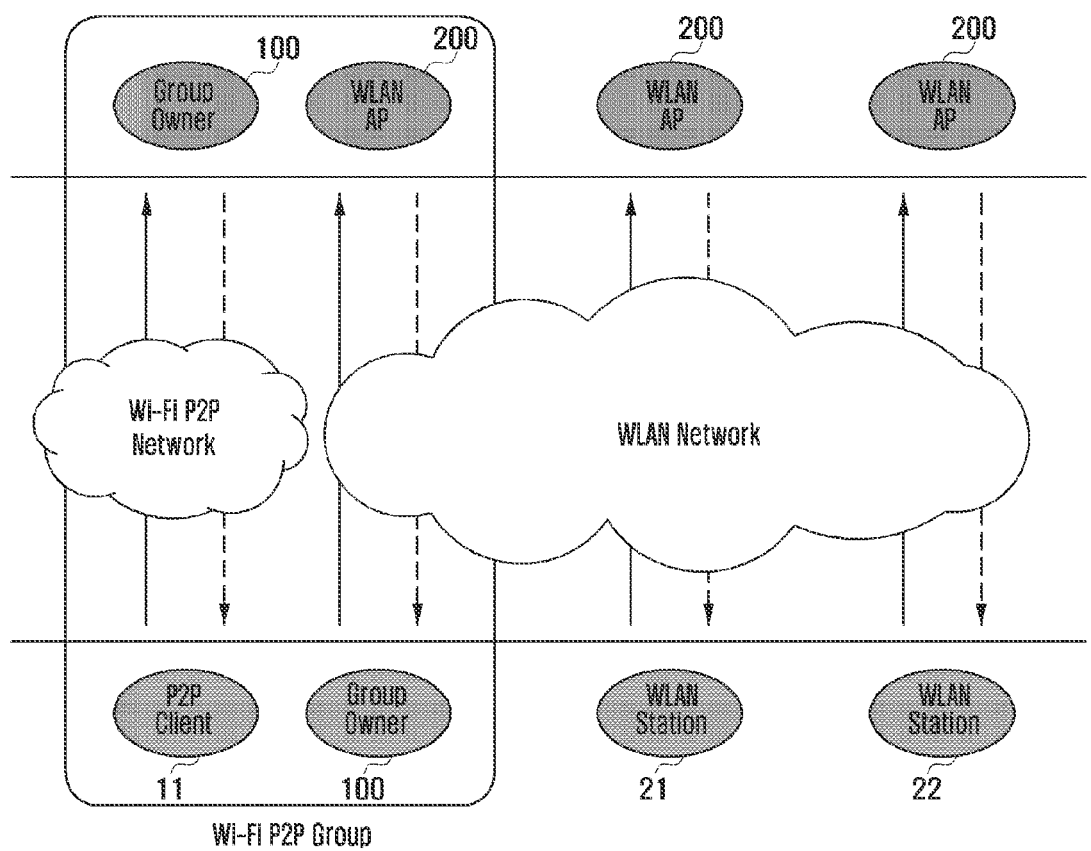
FIG. 2 is a diagram illustrating signal flows in a WLAN network sharing system with a Wi-Fi P2P group according to an exemplary embodiment of the present invention.

FIG. 2 is a diagram illustrating signal flows in a WLAN network sharing system with a Wi-Fi P2P group according to an exemplary embodiment of the present invention.

Referring to FIG. 2, the P2P client 11 of the Wi-Fi P2P group has to perform the channel access contention twice to transmit WLAN network sharing data via the WLAN AP 200. In more detail, the P2P client 11 contends for the radio channels on the Wi-Fi P2P network and WLAN. That is, the P2P client 11 contends for the channel to transmit data to the P2P group owner 100 on the Wi-Fi P2P network and for the channel to transmit the data from the P2P group owner 100 to the WLAN AP 200. In FIG. 2, the solid lines within the Wi-Fi P2P group denote the path of the data transmitted by the P2P client 11, and the solid lines denote the path of the data destined to the P2P client 11.

Meanwhile, the mobile stations that are not joined to the Wi-Fi P2P group, i.e. the WLAN mobile stations 21 and 22, need to perform the channel access contention only one time for data transmission on the WLAN. In FIG. 2, the solid lines in the WLAN denote the path of the data transmitted by the mobile station 21 and 22, and the dotted lines in the WLAN denote the path of the data destined to the mobile stations 21 and 22.

Since the P2P client 11 experiences a long data transmission delay that is two times longer than those of the WLAN mobile stations 21 and 22, the P2P client user is likely to feel dissatisfaction with the Quality of Service (QoS). Exemplary embodiments of the present invention are characterized in that, when the P2P client 11 attempts to transmit the WLAN network sharing data, the WLAN allocates a relatively higher priority to the WLAN network sharing data regardless of the priority assigned in the Wi-Fi P2P group so as to increase the channel occupancy probability of the P2P client 11 against the WLAN stations 21, and 22. That is, in the method of exemplary embodiments of the present invention, the WLAN network sharing data is assigned to the priority corresponding to the voice and video data among the priorities defined in the Wi-Fi standard so as to increase the channel occupancy probability of the P2P client 11 in the contention with the WLAN mobile stations 210 and 22. The priorities defined in the Wi-Fi standard are described in detail further below.

Figure 3:
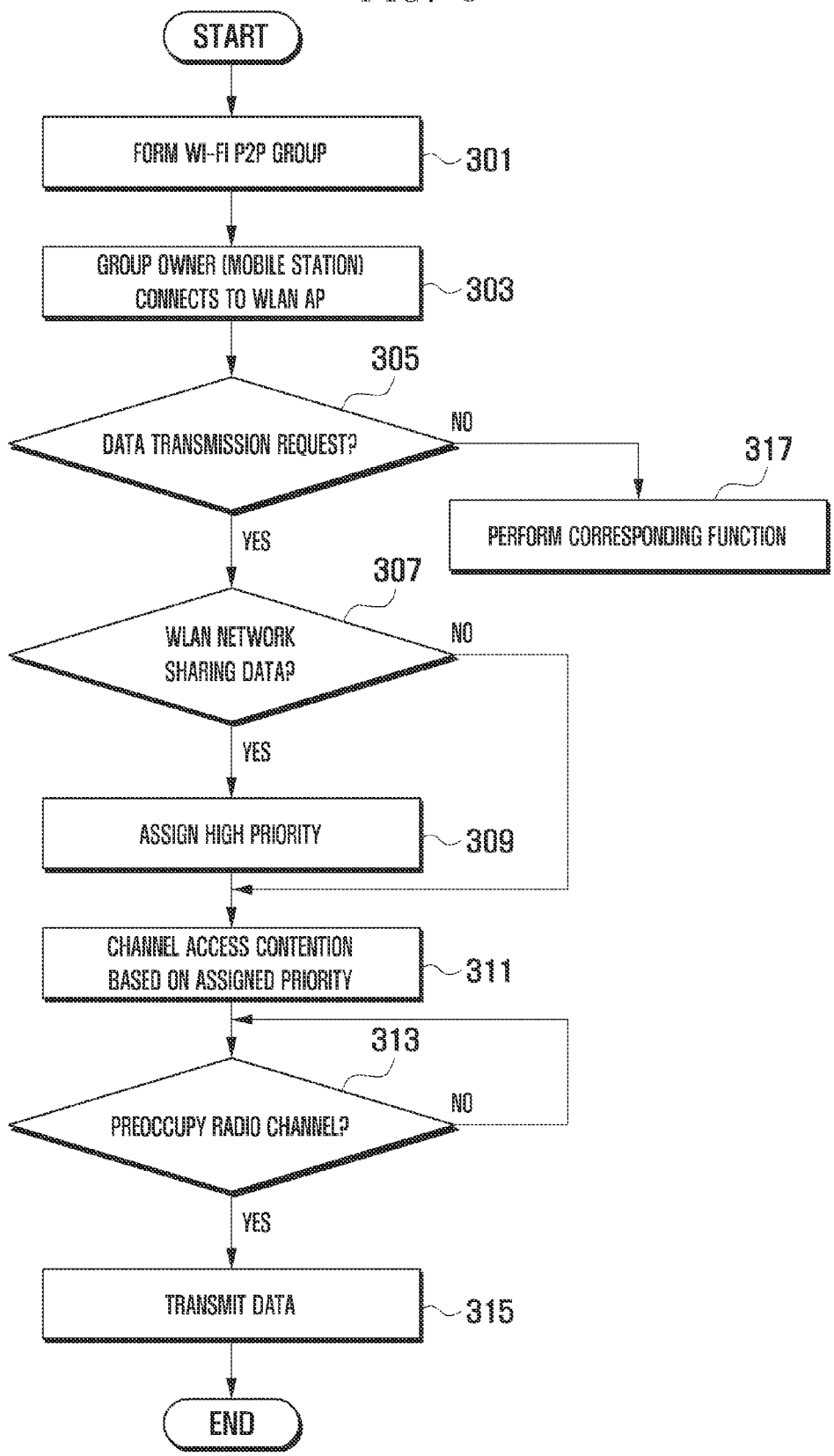
FIG. 3 is a flowchart illustrating a WLAN network sharing data transmission method of a Wi-Fi P2P group according to an exemplary embodiment of the present invention.

FIG. 3 is a flowchart illustrating a WLAN network sharing data transmission method of a Wi-Fi P2P group according to an exemplary embodiment of the present invention.

Referring to FIG. 3, the mobile station 100 establishes a Wi-Fi P2P group with at least one of the mobile stations 11, 12, and 13 in step 301. Here, the mobile station 100 can act as the Wi-Fi P2P group owner. The Wi-Fi P2P group allows the P2P group owner 100 and the P2P clients to communicate with each other directly by means of their Wi-Fi interfaces.

Once the Wi-Fi P2P group is established, the mobile station 100 connects to the WLAN AP 200 in step 303. Next, the mobile station 100 performs monitoring to detect a request for data transmission in step 305. If no data transmission request or a request for execution of a certain function is detected, the mobile station 100 performs a corresponding operation in step 317. For example, the mobile station 100 may stay in an idle state or execute any of music playback, video capture, and gaming functions in response to the user request.

If a request for data transmission is detected at step 305, the mobile station 100 determines whether the data to be transmitted is WLAN network sharing data in step 307. For this purpose, the mobile station 100 can check the destination Internet Protocol (IP) address included in the header of the data. The mobile station 100 can determine whether the WLAN network sharing data is to be transmitted outside of the WLAN via the WLAN AP 200, based on the destination IP address. However, the present invention is not limited thereto. For example, the mobile station 100 can check the WLAN network sharing data based on other types of information included in the transmission data. Since the methods for identifying the WLAN network sharing data are obvious to those skilled in the art, a detailed description thereon is omitted.

If the transmission-requested data is the WLAN network sharing data, the mobile station 100 assigns a priority higher than that of normal data, i.e., intra P2P data communicated within the Wi-Fi P2P group, in step 309. The priority assignment process can be performed using 4 Access Categories (ACs) defined in the Wi-Fi standard. This is for maintaining compatibility with the Wi-Fi mobile station of the related art. That is, the priority of the WLAN network sharing data can be configure to the same level as the priority of the QoS-sensitive voice and video data. For this purpose, the mobile station 100 can set the QoS field of the WLAN network sharing data to a code value indicating the priority. In a case where the QoS field of the WLAN network sharing data is disabled, the mobile station can enable the QoS field. The QoS field can be in compliance with an Internet Engineering Task Force (IETF) Differentiated Service Code Point (DSCP) header or Institute of Electrical and Electronics Engineers (IEEE) 802.1d tags.

The mobile station 100 can perform the channel access contention based on the assigned priority in step 311. The channel access contention includes the Wi-Fi P2P channel access contention for data transmission from the client to the P2P owner 100 and the WLAN channel accession contention for data transmission from the P2P owner 100 to the WLAN AP 200. In order to occupy the channel, the mobile station 100 can use the contention-based MAC algorithm. Since the channel access contention is obvious to those skilled in the art and well-known, a detailed description thereon is omitted.

If the transmission-requested data is not the WLAN network sharing data, the procedure proceeds to step 311. That is, if the transmission-requested data is not the WLAN network sharing data, the mobile station 100 skips priority assignment and performs the channel access contention using the priority assigned to the transmission-requested data (e.g., best-effort manner).

Afterward, the mobile station 100 performs monitoring to determine whether the radio channel is acquired in the channel access contention in step 313. If it fails to acquire the radio channel, the mobile station 100 continues monitoring at step 313. That is, the mobile station 100 can wait for a predetermined time and attempt radio access according to a preset rule. Otherwise if the access channel is acquired, the mobile station 100 transmits the WLAN network sharing data through the acquired radio channel in step 315.

Although the description is directed to the case where the P2P client transmits data to the WLAN AP 200 via the P2P owner 100, the present invention is not limited thereto. For example, exemplary embodiments of the present invention can be applied to the case where the P2P client receives data from the WLAN AP 200 via the P2P owner 100. In a case where the WLAN network sharing data are received from the WLAN AP 200, the P2P owner 100 assigns a relatively high priority to the WLAN network sharing data, performs channel access contention with the assigned priority to occupy the radio channel, and transmits the WLAN network sharing data to the corresponding P2P client.

The WLAN network sharing data transmission method for a P2P group according to exemplary embodiments of the present invention can be recorded in a non-transitory computer-readable storage medium in the form of program commands. Here, the non-transitory computer-readable storage media can store the program commands, data files, and data structures independently or in the form of their combination. The program commands recorded in the storage media can be the ones designed and configured for dedicated use in the exemplary embodiments of the present invention or the ones well-known to those in the computer software field.

The non-transitory computer-readable storage media may be magnetic media such as a hard disk, a floppy disk and magnetic tape, optical media such as a Compact Disk Read-Only Memory (CD-ROM) and a Digital Versatile Disk (DVD), magneto-optical media such as floptical disk, and hardware devices such as a ROM, a Random-Access Memory (RAM), a flash memory, etc., particularly implemented to store and execute program commands. The program commands may be machine language codes produced by a compiler and high-level language codes that can be executed by computers using an interpreter, etc. In order to perform the operations of the exemplary embodiments of the present invention, the hardware devices may be implemented to operate as at least one software module, and vice versa.

Figure 4:
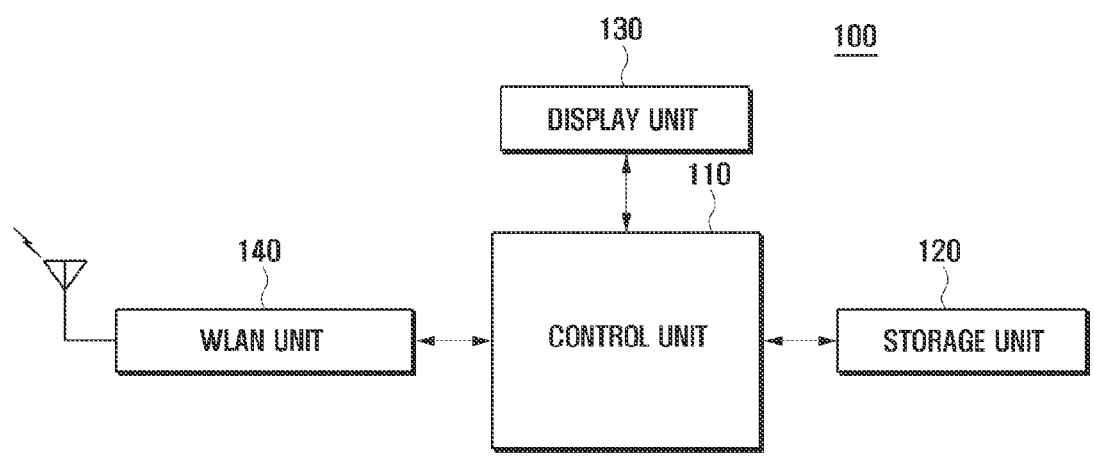
FIG. 4 is a schematic block diagram illustrating a configuration of a mobile station according to an exemplary embodiment of the present invention.

FIG. 4 is a schematic block diagram illustrating a configuration of a mobile station according to an exemplary embodiment of the present invention.

Referring to FIG. 4, the mobile station 100 according to an exemplary embodiment of the present invention includes a control unit 110, a storage unit 120, a display unit 130, and WLAN unit 140.

The display unit 130 displays the data input by or provided to the user in addition to various menus of the mobile station 100. For example, the display unit 130 can display various screens such as a standby mode screen, a message composition screen, a call progress screen, and a data transmission progress screen. The display unit 130 can be implemented with one of a Liquid Crystal Display (LCD), an Organic Light Emitting Diode (OLED), and an Active Matrix OLED (AMOLED).

The WLAN unit 140 is responsible for establishing a communication channel for communicating radio signals. The WLAN unit 140 also can establish 1:1 or 1:multiple network connections with other stations (e.g., a laptop, a digital camera, a digital TeleVision (TV), a mobile communication terminal, and a Portable Multimedia Player (PMP)) to form a Wi-Fi P2P group. The WLAN unit 140 can establish the connections for forming both the WLAN and Wi-Fi P2P network. The WLAN unit 140 enables the mobile station 100 to act as a member of the WLAN and the Wi-Fi P2P group owner. The WLAN unit 140 can transmit the WLAN network sharing data requested by a P2P client to the WLAN AP 200 and the WLAN network sharing data delivered by the WLAN AP 200 to the corresponding P2P client. The WLAN unit 140 can transmit/receive data communication within the Wi-Fi P2P group.

The storage unit 120 stores the programs used for the functional operations according to exemplary embodiments of the present invention and user data. For example, the storage unit 120 can store the data generated by the use of the mobile station 100, such as phonebook data, audio data, corresponding contents, and information corresponding to the user data. The storage unit 120 stores the programs for controlling the operations of the mobile station 100, an Operating System (OS) for booting the mobile station 100, application programs used for playing multimedia contents, and application programs for executing other optional functions of the mobile station 100, such as a camera function, an audio playback function, and a still and motion picture playback function. More particularly, in an exemplary embodiment of the present invention, the storage unit 120 stores the application program for determining the type of the data to be transmitted in response the transmission request from a mobile station within a Wi-Fi P2P group and assigns priority to the WLAN network sharing data.

The control unit 110 controls overall operations of the mobile station 100 and signaling among the internal function blocks of the mobile station 100. The control unit 100 can control the WLAN unit 140 to establish a connection with at least one other mobile station supporting a Wi-Fi function so as to form a Wi-Fi P2P group. At this time, the other mobile stations act as the P2P clients, and the mobile station 100 act as the P2P group owner. More particularly, in an exemplary embodiment of the present invention, if a P2P client as a member of the Wi-Fi P2P group makes a request for data transmission, the control unit 110 determines whether the data to be transmitted is the WLAN network sharing data. For this purpose, the control unit 110 can determine the type of the data. For example, the control unit 110 can check the destination IP address contained in the header of the data to determine whether the data is the WLAN network sharing data requested to be transmitted outside of the WLAN via the WLAN AP 200. However, the present invention is not limited thereto. That is, the mobile station 100 can discriminate the WLAN network sharing data and the local data communicated within the Wi-Fi P2P network from each other based on other information contained the data requested for transmission. Since there are various data discrimination techniques obvious to those skilled in the art, detailed descriptions thereon are omitted.

In a case where the transmission-requested data is the WLAN network sharing data, the control unit 110 assigns a relatively high priority to the WLAN network sharing data so as to facilitate occupation of the radio channel for data transmission through priority-based channel access contention. Afterward, the control unit 110 can control the WLAN unit to transmit the WLAN network sharing data to the WLAN AP 200 via the occupied radio channel.

In order to assign the priority, the control unit 110 checks the QoS field of the WLAN network sharing data so as, if disabled, to enable the QoS field and set the QoS field to a code value indicating the high priority. The QoS field can be in compliance with IETF Differentiated Service Code Point (DSCP) header or IEEE 802.1d tags. Here, the IEEE 802.1d tags can include four priorities defined in the Wi-Fi standard as shown in Table 1.

TABLE 1

| 802.12 priority | 802.1d Designation | Access Category | Wi-Fi MultiMedia (WMM) designation |
| --- | --- | --- | --- |
| 1 | BK | AC_BK | Background |
| 2 | — | | |
| 0 | BE | AC_BE | Best Effort |
| 3 | EE | | |
| 4 | CL | AC_VI | Video |
| 5 | VI | | |
| 6 | VO | AC_VO | Voice |
| 7 | NC | | |

Referring to Table 1, the priorities are categorized into four ACs. Each priority can have two code values. That is, the priorities can be classified into a background priority having the code values of 1 and 2, a best effort priority having the code values of 0 and 3, a video priority having the code values of 4 and 5, and a voice priority having the code values of 6 and 7. Except for 0, the greater the code value is, the higher the priority is. In the Wi-Fi communication or Wi-Fi P2P communication of the related art, all the types of data have the best effort priority without discrimination of priorities. In a case where all the types of data have the same priority, the WLAN network sharing data experiences a transmission delay twice as long as that of the WLAN network data. In an exemplary embodiment of the present invention, the control unit 110 assigns the voice or video priority, which is relatively higher, to the WLAN network sharing data. By transmitting the WLAN network sharing data with a relatively high priority, the exemplary embodiments of the present invention can increase the radio channel occupancy probability for transmission of the WLAN network sharing data, resulting in an increase in the transmission speed of the WLAN network sharing data in the Wi-Fi P2P network.

Meanwhile, in a case where the transmission-requested data is not the WLAN network sharing data, the control unit 110 controls such that the radio channel access contention is made with the priority set as default. The default priority can be the best effort priority.

Although the description is directed to the case of the outgoing WLAN network sharing data, the present invention is not limited thereto. That is, when the WLAN network sharing data is destined to a client of the P2P group via the WLAN AP 200, the control unit 110 assigns a relatively high priority to the incoming WLAN network sharing data for channel access contention to occupy the radio channel and controls the WLAN unit 140 to transmit the incoming WLAN network sharing data to the corresponding client.

Although not depicted in FIG. 4, the mobile station 100 can further selectively include at least one of a camera module for capturing still or motion pictures, a broadcast reception module for receiving broadcast signals, an audio playback module such as a Moving Picture Experts Group (MPEG)-1 or MPEG-2 Audio Layer-3 (MP3) module, and an approach sensor module for sensing an approaching object. Although not enumerated, various functional components equivalent to the aforementioned components can be incorporated in the mobile station according to the trend toward digital convergence.

As described above, the transmission method of exemplary embodiments of the present invention are capable of increased transmission speed (including inbound and outbound) of the WLAN network sharing data of the Wi-Fi P2P group formed in the WLAN. The transmission method of the exemplary embodiments of the present invention are capable of providing the mobile internet service user with high speed services. Also, the transmission method of the exemplary embodiments of the present invention use the priority concept defined in the Wi-Fi standard of the related art, thereby maintaining backward compatibility with the mobile stations of the related art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting Wireless Local Area Network (WLAN) sharing data in a Wi-Fi Peer-to-Peer (P2P) group, the method comprising:
   forming, by a mobile station that is a Wi-Fi P2P group owner, the Wi-Fi P2P group;
   establishing, at the Wi-Fi P2P group owner, a connection to a WLAN access point;
   identifying whether data, to be communicated with a mobile station that is a Wi-Fi P2P client, is WLAN network sharing data or intra-P2P data, which is communicated within the Wi-Fi P2P group, the WLAN network sharing data being outgoing to and incoming from outside of the Wi-Fi P2P group via the WLAN access point and the Wi-Fi P2P group owner;
   assigning a default priority to the intra-P2P data and a higher priority than the default priority to the WLAN network sharing data;
   performing, when the data is the WLAN network sharing data, a channel access contention based on the higher priority; and
   transmitting the WLAN network sharing data through a radio channel which is acquired by the channel access contention.

2. The method of claim 1, wherein the data, to be communicated with the mobile station that is the Wi-Fi P2P client, is data to be requested to transmit from the mobile station that is the Wi-Fi P2P client.

3. The method of claim 1, wherein the data, to be communicated with the mobile station that is the Wi-Fi P2P client, is data to be transmitted to the mobile station that is the Wi-Fi P2P client.

4. The method of claim 1, wherein the assigning comprises:
   enabling a Quality of Service (QoS) field of the WLAN network sharing data; and
   setting the QoS field to a code value indicating the higher priority.

5. The method of claim 4, wherein the QoS field comprises one of an Internet Engineering Task Force (IETF) Differentiated Service Code Point (DSCP) header and Institute of Electrical and Electronics Engineers (IEEE) 802.1d tags.

6. The method of claim 1, further comprising transmitting, when the data is not the WLAN network sharing data, the data through the radio channel with a priority set as default.

7. The method of claim 4, wherein the code value is one of a voice priority, a video priority, a best effort priority, and a background priority.

8. The method of claim 4, wherein code value is one of an audio priority and a video priority indicating QoS-sensitive data to the WLAN network sharing data.

9. The method of claim 1, further comprising:
   assigning, when the mobile station that is the Wi-Fi P2P group owner receives the WLAN network sharing data from the WLAN access point, a relatively high priority to the WLAN network sharing data; and
   transmitting the WLAN network sharing data on the radio channel with the assigned priority.

10. The method of claim 1, wherein the channel access contention comprises a Wi-Fi P2P channel access contention for data transmission from the mobile station that is the Wi-Fi P2P client to the mobile station that is the Wi-Fi P2P group owner and a WLAN channel access contention for data transmission from the mobile station that is the Wi-Fi P2P group owner to the WLAN access point.

11. An apparatus for transmitting Wireless Local Area Network (WLAN) sharing data in a Wi-Fi Peer-to-Peer (P2P) group, the apparatus comprising:
   a WLAN unit configured to:
      establish a mobile station as an owner of the Wi-Fi P2P group,
      establish a connection with at least one mobile station functioning as a Wi-Fi P2P client to form the Wi-Fi P2P group, and
      access a WLAN access point; and
   a control unit configured to:
      identify whether data, to be communicated with the at least one mobile station operating as a Wi-Fi P2P client, is WLAN network sharing data or intra-P2P data which is communicated within the Wi-Fi P2P group, the WLAN network sharing data being outgoing to and incoming from outside of the Wi-Fi P2P group via the WLAN access point and the Wi-Fi P2P group owner, assign a default priority to the intra-P2P data and a higher priority than the default priority to the WLAN network sharing data, which is communicated within the Wi-Fi P2P group, and perform, when the data is the WLAN network sharing data, a channel access contention based on the higher priority, wherein the WLAN unit transmits the WLAN network sharing data through a radio channel which is acquiring by the channel access contention.

12. The apparatus of claim 11, wherein the data, to be communicated with the mobile station that is the Wi-Fi P2P client, is data to be requested to transmit from the mobile station that is the Wi-Fi P2P client.

13. The apparatus of claim 11, wherein the data, to be communicated with the mobile station that is the Wi-Fi P2P client, is data to be transmitted to the mobile station that is the Wi-Fi P2P client.

14. The apparatus of claim 11, wherein the control unit is configured to transmit, when the data is not the WLAN network sharing data, the data through the radio channel with a priority set as default.

15. The apparatus of claim 11, wherein the control unit is configured to:

enable a Quality of Service (QoS) field of the WLAN network sharing data, and set the QoS field to a code value indicating the higher priority.

16. The apparatus of claim 15, wherein the QoS field comprises one of an Internet Engineering Task Force (IETF) Differentiated Service Code Point (DSCP) header and Institute of Electrical and Electronics Engineers (IEEE) 802.1d tags.

17. The apparatus of claim 15, wherein the code value is a value of one of a voice priority and a video priority indicating QoS-sensitive data.

18. The apparatus of claim 11, wherein the control unit is configured to:

assign, when the WLAN network sharing data is received from the WLAN access point, a relatively high priority to the WLAN network sharing data, and transmit the WLAN network sharing data on the radio channel with the assigned priority.

* * * * *